United States Patent [19]

Meissner et al.

[11] Patent Number: 5,172,318
[45] Date of Patent: Dec. 15, 1992

[54] METHOD FOR THE DETECTION OF CURVES AND THE DETERMINATION OF THE TRANSVERSE ACCELERATION IN A VEHICLE

[75] Inventors: Manfred W. Meissner, Unterriexingen; Alfred Sigl, Sersheim, both of Fed. Rep. of Germany

[73] Assignee: Robert Bosch GmbH, Stuttgart, Fed. Rep. of Germany

[21] Appl. No.: 885,920

[22] PCT Filed: Sep. 15, 1988

[86] PCT No.: PCT/EP88/00841
§ 371 Date: May 9, 1990
§ 102(e) Date: May 9, 1990

[87] PCT Pub. No.: WO89/02602
PCT Pub. Date: Mar. 23, 1989

Related U.S. Application Data

[63] Continuation of Ser. No. 466,370, May 9, 1990, abandoned.

[30] Foreign Application Priority Data

Sep. 16, 1987 [DE] Fed. Rep. of Germany ....... 3731077

[51] Int. Cl.⁵ .................. B60T 8/32; G01P 15/08
[52] U.S. Cl. .................. 364/426.02; 364/426.03; 364/566; 180/197
[58] Field of Search .................. 364/565, 566, 424.01, 364/424.05, 426.01, 426.02, 426.03, 426.04; 324/160, 161; 180/197; 73/495, 507

[56] References Cited

U.S. PATENT DOCUMENTS

| | | | |
|---|---|---|---|
| 4,085,363 | 4/1978 | Gravina et al. | 324/162 |
| 4,530,056 | 7/1985 | MacKinnon et al. | 364/424.02 |
| 4,566,737 | 1/1986 | Masaki et al. | 303/109 |
| 4,669,046 | 5/1987 | Kubo | 364/426.02 |
| 4,718,013 | 1/1988 | Kubo | 364/426.02 |
| 4,849,891 | 7/1989 | Krohn et al. | 364/426.03 |

FOREIGN PATENT DOCUMENTS 0126052 11/1984 European Pat. Off.

*Primary Examiner*—Kevin J. Teska
*Assistant Examiner*—Collin W. Park
*Attorney, Agent, or Firm*—Felfe & Lynch

[57] ABSTRACT

A method for detecting when a vehicle drives in a curve for which the wheel speed sensors of the non-driven wheels are sufficient and supplies a correct statement even in case of interferences or different circumferential distances. Also, an output signal can be recovered which corresponds to the values of the available transverse acceleration.

13 Claims, 2 Drawing Sheets

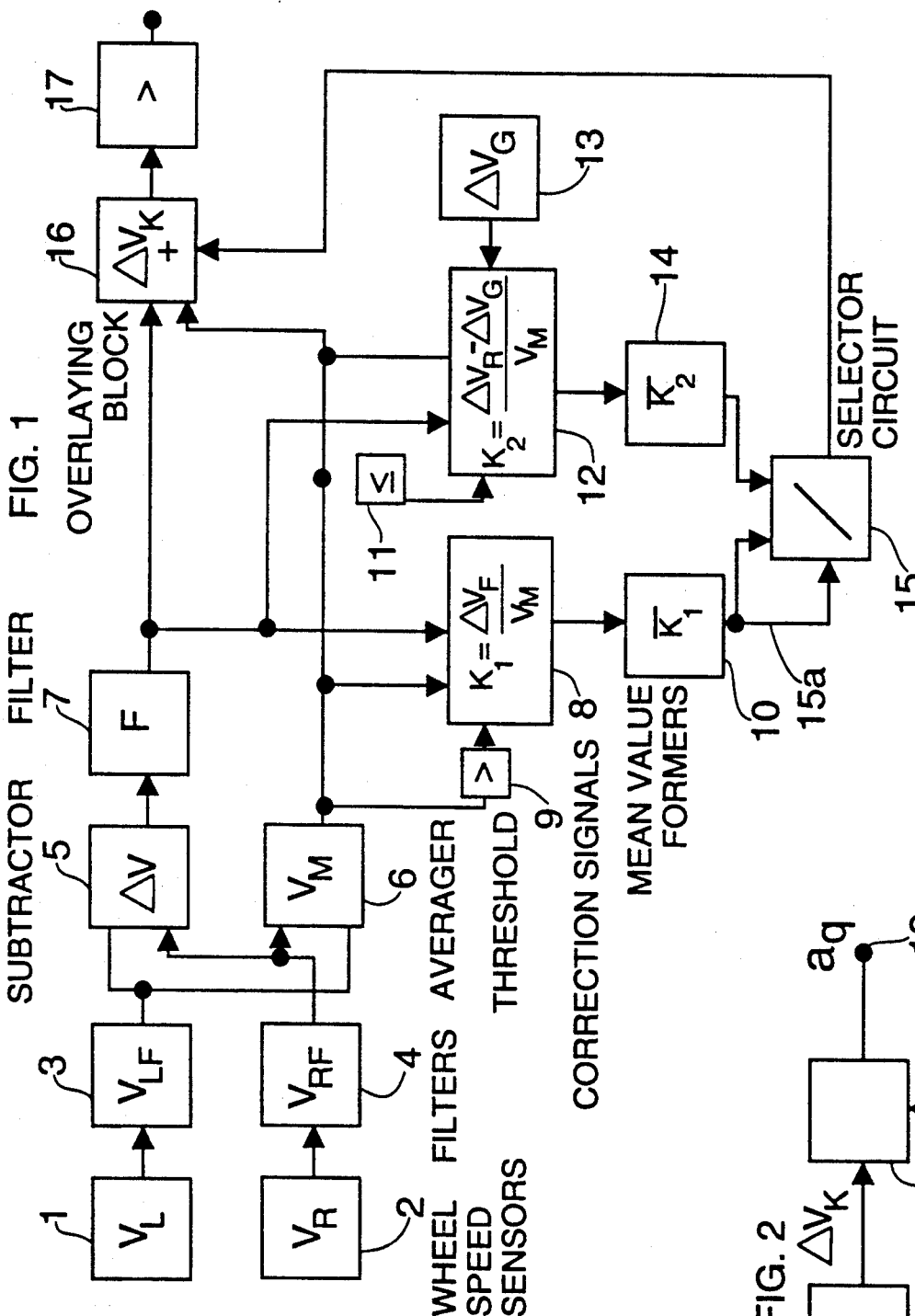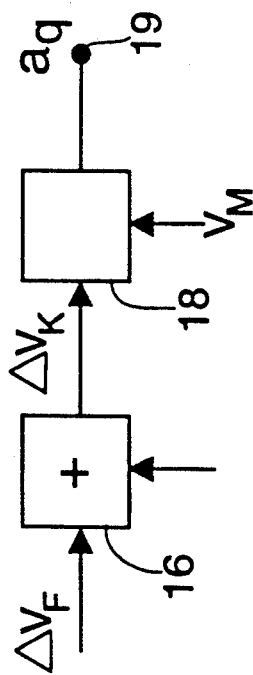

METHOD FOR THE DETECTION OF CURVES AND THE DETERMINATION OF THE TRANSVERSE ACCELERATION IN A VEHICLE

This application is a continuation of application Ser. No. 07/466,370, filed May 9, 1990, now abandoned.

BACKGROUND OF THE INVENTION

The invention relates to a method for generating different signals depending on whether a vehicle drives in a curve or on a straightaway and a method for determining the transverse acceleration while driving in curve.

From navigation systems it is known to determine the approximate driving direction of the vehicle from the difference $\Delta v$ of the sensor signals from the non-driven wheels of a vehicle.

In anti brake lock control systems or anti slip control systems, it is also known to use steering angle sensors and/or transverse accelerometer and supply the output signals thereof as parameters to the control. The use of only the difference $\Delta V$ is not sufficient in this case since interferences can adversely affect these differences and since different circumferential distances (wheel diameters) can also lead to incorrect statements.

According to the invention, the difference $\Delta v$ between the speeds of the left and right non-driven wheels is filtered so that the filtered difference $\Delta v_F$ follows those changes having an increase greater than $\pm$ a with a delay, where a is about 0.2 g.

$\Delta v_F$ and the mean valve $v_M$ of the speed signals serve to form correction signals $K_i$ according to the relation:

$$K_1 = \frac{\Delta v_F}{v_M} \text{ if } v_M > b \text{ km/h}$$

and $$K_2 = \frac{\Delta v_F - \Delta v_G}{v_M} \text{ if } v_M \leq b \text{ km/h}$$

where $\Delta v_g$ is a function which is stored and dependent upon the vehicle speed, and $K_2$ is formed only when $|\Delta v_F| > \Delta v_G$. A mean value $\overline{K}_i$ is formed from the successively determined correction signals $K_i$, and a corrected difference $\Delta v_k$ is formed from $\Delta v_F$ according to $$\Delta v_K = \Delta v_F - \overline{K}_i v_M$$

wherein the correction $\overline{K}_1$ is used when $K_1$ is formed once during a ride. A signal which indicates driving in a curve is generated if $\Delta v_K$ exceeds a small speed value.

BRIEF DESCRIPTION OF THE DRAWINGS

FIG. 1 is block diagram of a preferred embodiment;
FIG. 2 illustrates a variation of the diagram of FIG. 1.

DETAILED DESCRIPTION OF THE PREFERRED EMBODIMENT

Figure 3:
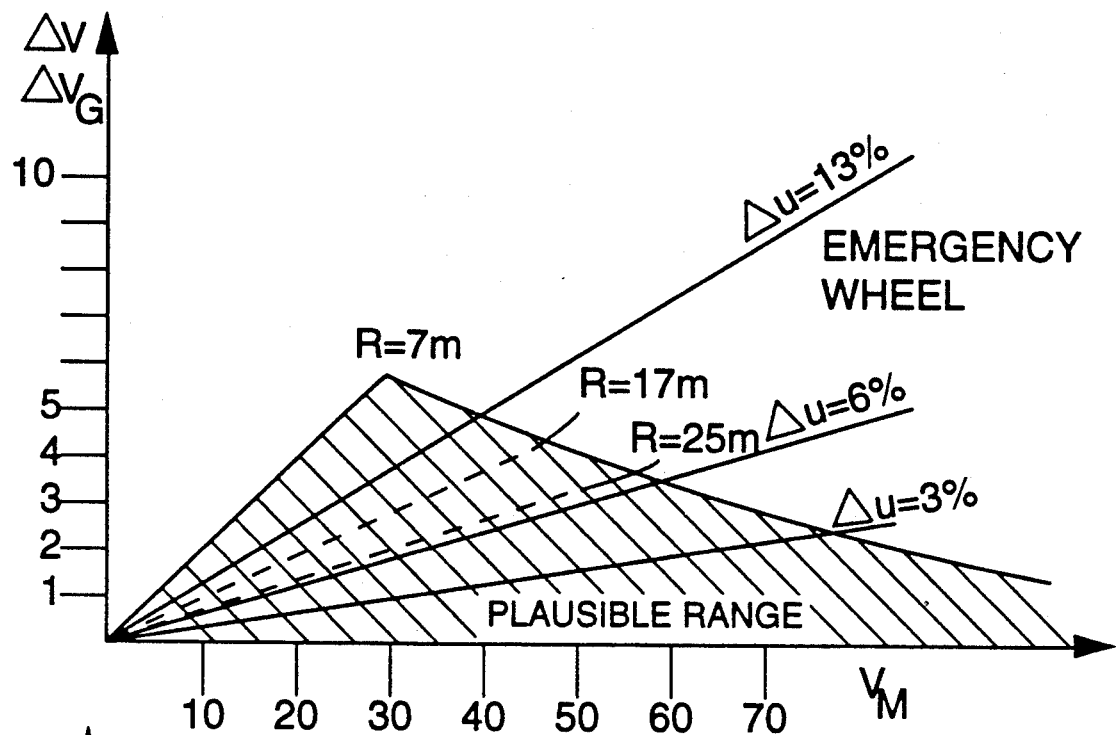
FIG. 3 is a plot of the differential speed signal $\Delta v_G$ which is necessary to calculate the low speed correction signal, versus speed.

In FIG. 1 the sensors associated with the non-driven wheels bear the reference numerals 1 and 2 and the filters downstream thereof are referenced as 3 and 4. These filters are configured such that the output signals $V_{LF}$ and $V_{RF}$ of these filters can follow the wheel speed signals $V_L$ and $V_R$ of the sensors 1 and 2 only up to a maximum slope C of $\pm 1.38$ g, for example. A block 5 forms the difference $\Delta V$ of the filtered signals. A block 6 forms the average value of the filtered signals $$V_M = \frac{V_{LF} + V_{RF}}{2}.$$

A block 7 serves to filter the differential signal $\Delta V$.

The filtering is configured such that the output signal $\Delta V_F$ of the filter 7 can follow the input signals $\Delta V$ only up to a maximum slope of for example $\pm 0.18$ g. This measurement is based on the knowledge that faster changes of interferences cannot be caused by normal speed changes.

A correction signal $K_1$ is formed in the blocks 8 and 9. For this purpose, the signals $\Delta V_F$ and $V_M$ are supplied to block 8. Moreover, the threshold value stage 9 activates this block 8 only if the speed $V_M$ (=vehicle speed) exceeds 100 km/h, for example. From the $K_1$-values which are determined in successive, short periods of time, a block 10 forms the mean value $\overline{K}_1$ which is then stored. At the twenty-first measurement, for example, the $\overline{K}_1$-value reads:

$$\overline{K}_1 = \frac{20 \overline{K}_1 + K_{1new}}{21}$$

It is also possible to interrupt the mean value formation after a certain number of values and use only the last determined mean value while driving.

The blocks 11-13 are used to determine the correction values $K_2$. For this purpose, the signals $\Delta V_F$ and $V_M$ are supplied to the subtracting block, the dividing block, and the comparing block 12.

The expression $$K_2 = \frac{\Delta V_F - \Delta V_G}{V_M}$$

is formed when the threshold value stage 11 activates the block 12 at $V_M \leq 100$ Km/h and when $\Delta V_F > \Delta V_G$. The value $\Delta V_G$ which is necessary for the formation of $K_2$ and the comparison is stored as a curve in memory 13. In FIG. 3, this curve $\Delta V_G$ is represented as a function of the speed $V_M$. The area with the hatching, which the curve defines, represents the plausibility area. The curve itself represents the plansibility boundary speed in dependency upon the vehicle speed. Different circumferential distances (wheel diameters) or a rotation of the vehicle around the vertical axis can cause the value of $(\pm \Delta V_F)$ to exceed this limit. With an increasing speed, the plausibility check which is carried out in the invention gains effectiveness. Therefore, the correction value $K_1$ recovered above 100 km/h and when recovered even once, is preferred. A selector circuit 15 represented as a switch selects the value $K_1$ for the remainder of the ride if this value was recovered once while driving. This is indicated by line 15a. From the $K_2$-values an averaged value $\overline{K}_2$ is also recovered in a block 14.

In an overlaying block 16, the so recovered correction value $\overline{K}_1$ or $\overline{K}_2$, combined with $V_M$, is overlayed on $\Delta V_F$ to form the corrected differential speed signal $\Delta V_K$ which is positive or negative depending on the curve direction. A downstream comparator 17 releases a signal when $\Delta V_K$ exceeds a small speed value of, for example, 2 km/h (curve determination) and changes the signal when, for example, the value falls below 1.5 km/h (straightaway determination).

Figure 4:
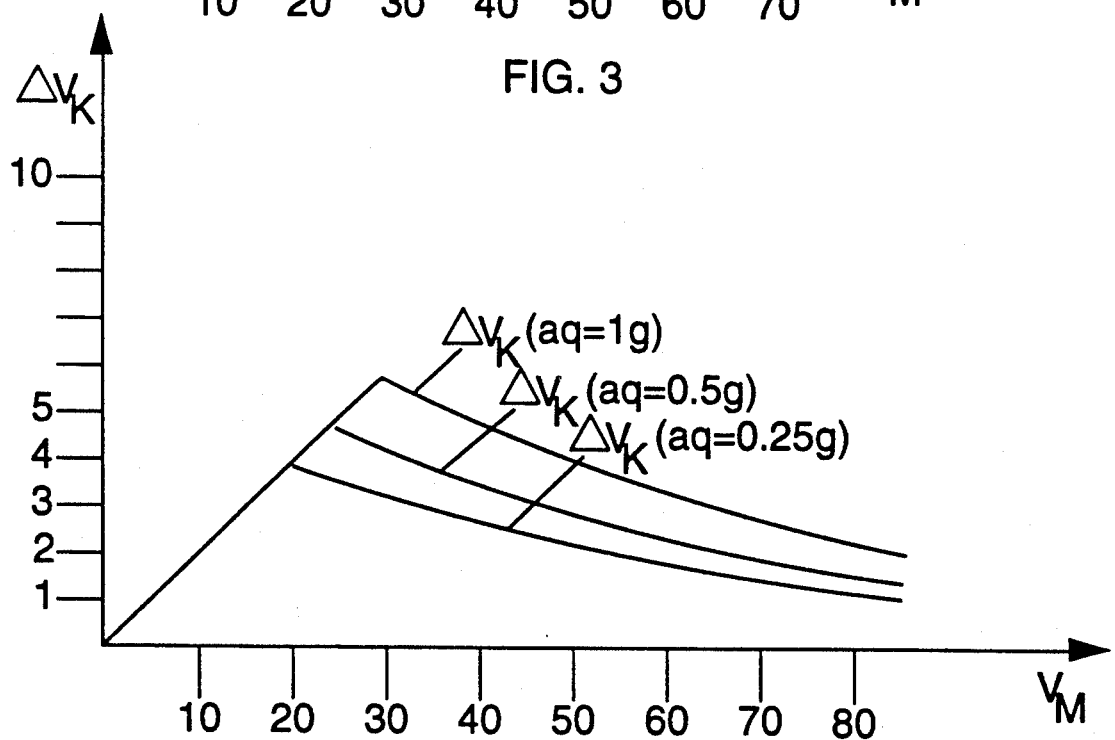
FIG. 4 is a plot of the corrected differential signal $\Delta v_K$ for different transverse accelerations, versus speed.

If an element 18 where the curves corresponding to FIG. 4 are stored, where these curves represent the functions $\Delta V_K$ of speed for different transverse accelerations $a_q$, is placed downstream of the overlaying element 16 of FIG. 2, it is possible to determine at this point the corresponding transverse acceleration $a_q$ when inputting $\Delta V_K$ and the speed $V_M$. The value can be output at terminal 19.

We claim:

1. Method for controlling one of brake slippage and drive slippage in a vehicle having two non-driven wheels when said vehicle is driven in a curve, said method comprising measuring the speeds of said non-driven wheels to produce wheel speed signals $V_L$ and $V_R$;

determining the difference $\Delta V = V_L - V_R$, said difference having a slope;

filtering said difference to produce a filtered difference $\Delta V_F = \Delta V$ when said slope is less than a predetermined value $\pm$ a, said filtered difference $\Delta V_F$ having a slope $\pm$ a when the slope of $\Delta V$ is greater than $\pm$a;

forming a mean value $V_M = \frac{1}{2}(V_L + V_R)$;

forming correction signals $K_i$ according to the equations $K_1 = \Delta V_F / V_M$ when $V_M$ exceeds a predetermined speed and $K_2 = (\Delta V_F - \Delta V_G)/V_M$ when $V_M$ is less than or equal to said predetermined speed, $\Delta V_G$ being a stored value dependent upon vehicle speed, forming a mean value $K_i$ from successively determined correction signals $K_i$;

forming a corrected speed difference $\Delta V_K = \Delta V_F - K_i V_M$, wherein $K_i = K_1$ when $K_1$ was formed at least once during a ride, generating a signal indicative of a curve when $\Delta V_K$ exceeds a curve determination speed value, and controlling one of brake slippage and drive slippage in said vehicle by using said signal indicative of a curve as a control parameter in a respective one of an antilock brake system and an antislip drive system of the vehicle.

2. Method as in claim 1 wherein said predetermined value $\pm$ a is $\pm 0.2$ g.

3. Method as in claim 1 wherein said curve determination value is 2 km/h.

4. Method as in claim 3 wherein said straightaway determination value is 1.5 km/h.

5. Method as in claim 1 further comprising generating a signal indicative of a straightaway when $\Delta V_K$ falls below a straightaway determination value.

6. Method as in claim 1 wherein said predetermined speed is 100 km/h.

7. Method as in claim 1 wherein said wheel speed signals $V_L$ and $V_R$ are filtered to produce respective filtered values $V_{LF}$ and $V_{RF}$ having a slope up to a predetermined value c.

8. Method as in claim 7 wherein said predetermined value c is 1.4 g.

9. Method for controlling at least one of brake slippage and drive slippage in a vehicle having two non-driven wheels when said vehicle is driven in a curve, said method comprising measuring the speeds of said non-driven wheels to produce wheel speed signals $V_L$ and $V_R$;

determining the difference $\Delta V = V_L - V_R$, said difference having a slope;

filtering said difference to produce a filtered difference $\Delta V_F = \Delta V$ when said slope is less than a predetermined value said filtered difference $\Delta V_F$ having a slope $\pm$ a;

forming a mean value $V_M = \frac{1}{2}(V_L + V_R)$;

forming correction signals $K_i$ according to the equations $K_1 = \Delta V_F / V_M$ exceeds a predetermined speed and $K_2 = (\Delta V_F - \Delta V_G)/V_M$ when $V_M$ is less than or equal to said predetermined speed, $\Delta V_G$ being a stored value dependent upon vehicle speed, forming a mean value $K_i$ from successively determined correction signals $K_i$;

forming a corrected speed difference $\Delta V_K = \Delta V_F - K_i V_M$, wherein $K_i = K_1$ when $K_1$ was formed at least once during a ride, determining a transverse vehicle acceleration $a_q$ by inputting said corrected speed value $\Delta V_K$ and said mean value $V_M$ into a unit which stores plots of $\Delta V_K$ versus $V_M$ for various transverse vehicle accelerations, and controlling one of brake slippage and drive slippage in said vehicle by using said transverse acceleration as a control parameter in a respective one of an antilock brake system and an antislip drive system of the vehicle.

10. Method as in claim 9 wherein said predetermined value $\pm$ a is $\pm 0.2$ g.

11. Method as in claim 9 wherein said predetermined speed is 100 km/h.

12. Method as in claim 9 wherein said wheel speed signals $V_L$ and $V_R$ are filtered to produce respective filtered values $V_{LF}$ and $V_{RF}$ having a slope up to a predetermined value c.

13. Method as in claim 12 wherein said predetermined value c is $\pm 1.4$ g.

* * * * *

UNITED STATES PATENT AND TRADEMARK OFFICE
CERTIFICATE OF CORRECTION

PATENT NO. : 5,172,318
DATED : December 15, 1992
INVENTOR(S) : Meissner et al.

It is certified that error appears in the above-indentified patent and that said Letters Patent is hereby corrected as shown below:

Column 1, line 27: Between lines 26-27 insert:
--SUMMARY OF THE INVENTION
The invention is based on the object of providing a useful curve detection using only the speed sensors, hence, without additional sensors. Further, a determination is to be made on the available transverse acceleration.--.

Column 1, line 50: The equation should read: $-- \Delta v_K = \Delta v_F - \bar{K}_i v_M --$ Column 2, line 30: The equation should read:

$$-- \bar{K}_1 = \frac{20 \bar{K}_1 + K_{1new}}{21} --.$$

Signed and Sealed this

Seventh Day of March, 1995

Attest:

BRUCE LEHMAN

Attesting Officer

Commissioner of Patents and Trademarks